I. S. SCHNEIDER & J. LANDAUER.
VALVE MECHANISM.
APPLICATION FILED AUG. 31, 1917.

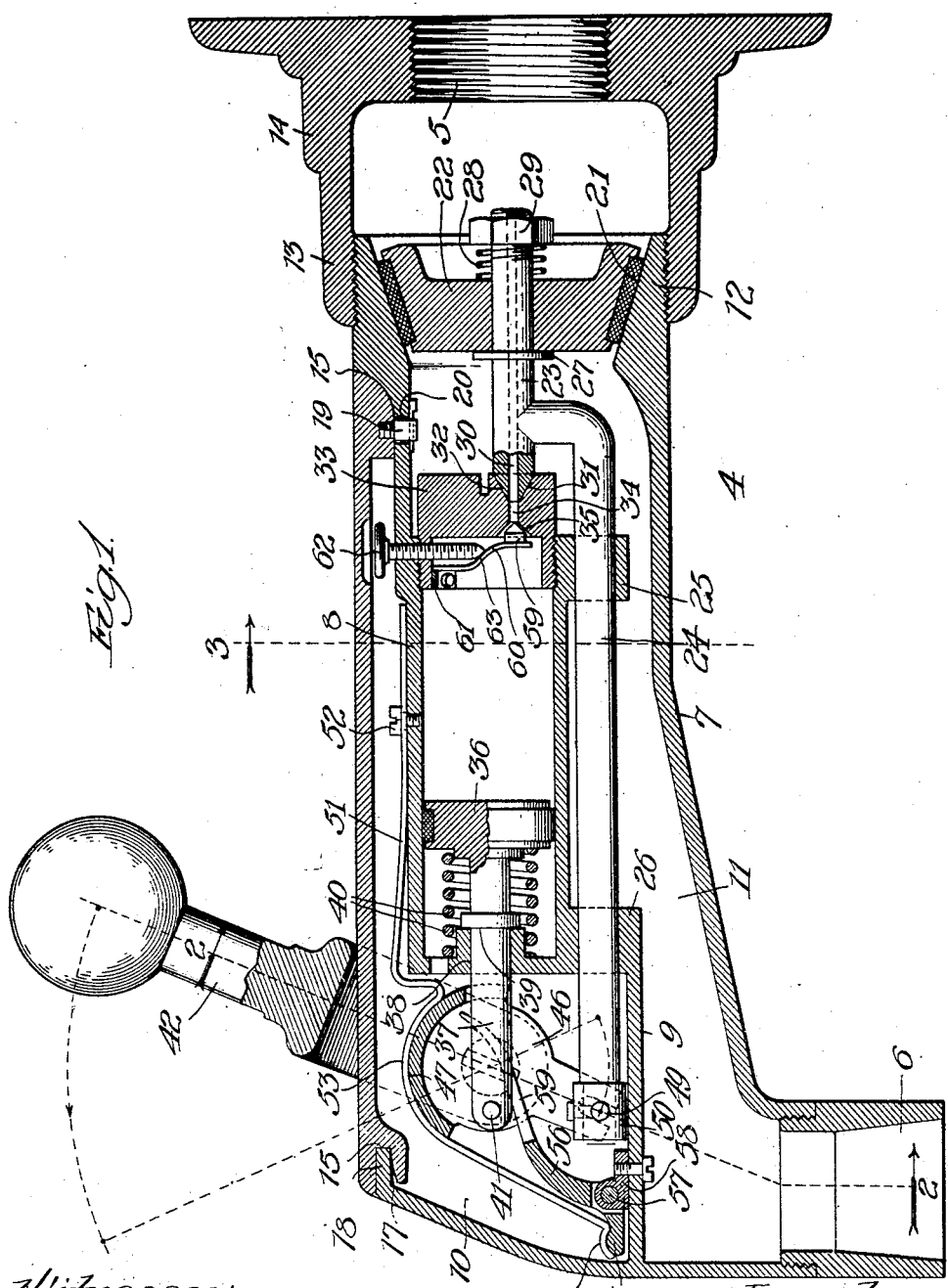

1,287,457.

Patented Dec. 10, 1918.
2 SHEETS—SHEET 2.

Witnesses:

Inventors,
Isadore S. Schneider
Josef Landauer

UNITED STATES PATENT OFFICE.

ISADORE S. SCHNEIDER AND JOSEF LANDAUER, OF CHICAGO, ILLINOIS.

VALVE MECHANISM.

1,287,457.  Specification of Letters Patent.  Patented Dec. 10, 1918.

Application filed August 31, 1917. Serial No. 189,049.

*To all whom it may concern:*

Be it known that we, ISADORE S. SCHNEIDER, a citizen of the United States, and JOSEF LANDAUER, a subject of the Emperor of Austria, residing at Chicago, in the county of Cook and State of Illinois, have invented a new and useful Improvement in Valve Mechanism, of which the following is a specification.

Our invention relates more particularly to valve mechanism used in faucets or for flushing purposes; and our primary objects are to provide, as a feature to both a faucet and flushing valve, for the automatic operation of the valve to permit of the flow therethrough of a predetermined amount of water, and in addition, so far as its use in a faucet is concerned, to provide a valve whereby the operator may operate it to hold it open indefinitely, or close the valve at any time following the opening of the same, regardless of the amount of water which has passed through the valve, and to provide for the automatic closing of the valve following the manual opening thereof.

Figure 3:
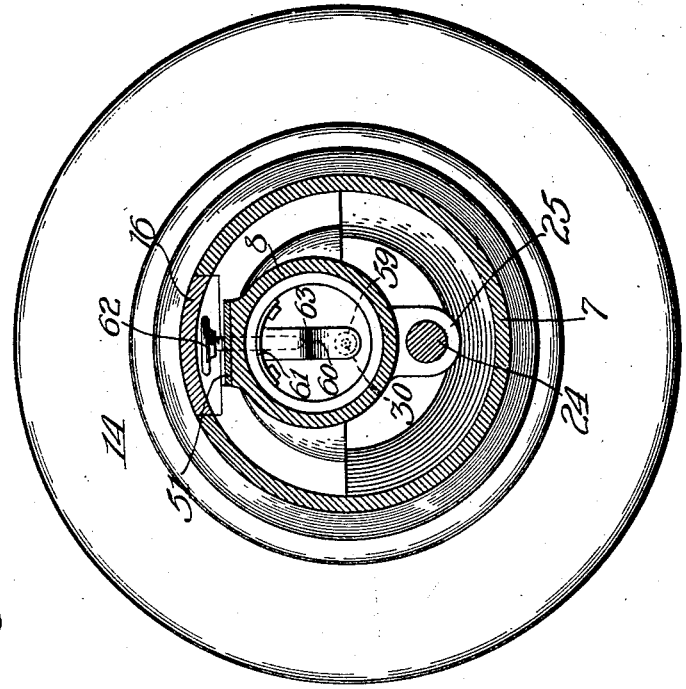
Figure 2:
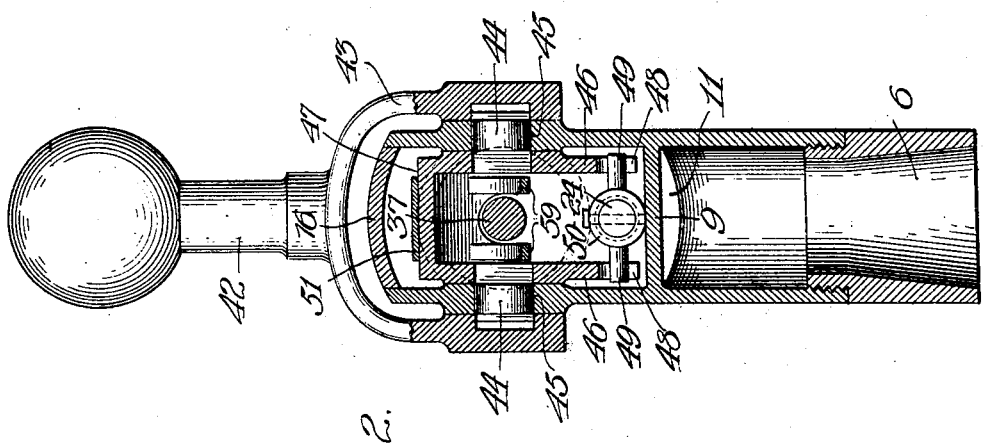

Referring to the accompanying drawings, Figure 1 is a view in longitudinal sectional elevation of a faucet embodying our invention. Fig. 2 is a section taken at the irregular line 2—2 on Fig. 1 and viewed in the direction of the arrows, and Fig. 3 is a section taken at the line 3 on Fig. 1 and viewed in the direction of the arrow.

According to the preferred illustrated embodiment of our invention, a casing 4 containing an inlet 5 and an outlet 6 is provided. The body of the casing is formed of a hollow member 7 containing a cylinder 8 extending lengthwise thereof which connects with a partition 9, whereby the space indicated at 10, in front of the cylinder 8 and above the partition 9, and reaching back over the cylinder 8 is closed to the space beneath it, as indicated at 11, this last referred to space forming a channel through which the water entering the casing through the inlet 5 discharges through the outlet 6. The portion 7 of the casing is screw-threaded at its right-hand end in Fig. 1, as represented at 12, at which it engages the threaded portion 13 of a socket-member 14 containing the inlet 5, at which member the faucet fits against a wall. The upper end of the member 7 contains an opening 15 for receiving the removable cover-section 16 of the casing which extends at a recess 17 provided in its forward end into interlocking relation with a rearwardly-extending flange 18 on the section 7, and carries a pin 19 at its rear end adapted to enter a slot 20 in the cylinder-section 8.

The casing 7 adjacent the inlet 5 is provided with a valve-seat 21, shown of frusto-conical shape, with which a tapered valve 22 coöperates, this valve being adapted to close against said seat in the direction of the flow of water into the casing through the inlet 5. The valve 22 is equipped with a valve-stem formed of the section 23 and the off-set section 24 connected therewith, as shown, and having sliding bearing in a lug 25 on the cylinder 8 and a portion of the member 8 at which the latter is directly connected with the partition 9, the forward end of the stem 24 extending into the space 10. The valve 22 is preferably slidably mounted upon the stem-section 23 and is yieldingly held against a collar 27 thereon through the medium of a spiral spring 28 surrounding the stem 23, and confined between the valve 22 and nut 29 on this stem. The stem-section 23 contains an opening 30 extending longitudinally therethrough, the left-hand end of this stem being of frusto-conical shape, as represented at 31, and coöperating with a similarly shaped valve-seat 32 provided in a plug 33 which screws into an end of the cylinder 8, this plug containing a passage 34 opening at one end through the seat 32 and at its opposite end expanded as represented at 35. The cylinder 8 contains a piston 36 on a rod 37 which has sliding bearing at 38 in the end wall of the cylinder 8, this rod carrying a collar 39 which forms a stop for the movement of the piston to the left in Fig. 1 under the action of the water flowing into the cylinder 8, as hereinafter described, and being surrounded by a coiled spring 40 which bears at one end against the adjacent end wall of the cylinder 8, and at its opposite end against the piston 36, for a purpose hereinafter described. The forward end of the rod 37 extends into the space 10, where it is provided with a cross-pin 41.

The operating handle of the valve is represented at 42, this handle being formed at its lower end with a yoke-portion 43 which straddles the casing 4, as shown in Fig. 2, and is pivotally supported through the medium of trunnions 44 with which the arms of the yoke 43 are connected, and which are journaled in bearing-portions 45 of the casing 4. The inner end of the trunnions are rigidly connected with a yoke-member 46, the upper surface of which is of arc-shape, as represented at 47, and the lower ends of which extend downwardly below the trunnions 44 and contain notches 48 at which the frame 47 engages lugs 49 extending laterally from a head 50 secured to the forward end of the rod-section 24. A spring, shown of the leaf type, is represented at 51, this spring extending along the upper side of the cylinder 8 and secured thereto as by the screw 52, its forward end being bent to conform to the arc surface 47 of the yoke 46 against which it normally bears to act as a brake for a purpose hereinafter described. The forward lower free end of the spring 51 is formed with a flanged section 54 which engages a similarly shaped portion 55 of a bell-crank lever 56 fulcrumed on a pivot 57 supported in a bearing 58 in the space 10, the rearwardly and upwardly extending portion of this bell-crank lever being bifurcated as represented at 59, with its upper surface extending generally at an inclination to the plane of movement of the rod 37 and extending into the path of movement of the pin 41, in the travel of the rod 37 from the position shown in Fig. 1 to the right in this figure under the action of the spring 40, as hereinafter described.

The operation of the device is as follows:

The inlet 5 being connected with the water under pressure, the valve 22 is in closed position against the seat 21, the incoming water maintaining it closed, and the cylinder 8 is filled with water under the same pressure as that at the inlet, by reason of the communication between the interior of the cylinder 8 and the inlet 5 through the conduits 30 and 34, the piston 36 in this position being shifted to the left as shown in Fig. 1, wherein the spring 40 is compressed and the pin 41 extended forwardly out of engagement with the bell-crank 56. To operate the valve the operator grasps the handle 42 and swings it to the left in Fig. 1, with the result of shifting the valve-rod sections 24 and 23 and the valve 22 to the right in Fig. 1, which opens the outlet 6 of the casing to the inlet 5 and water flows through the faucet, the water continuing to flow so long as the operator holds the handle 42 in the position stated. As soon as the valve 22 is opened, which unseats the valve-section 23, the spring 40 acting against the piston 36 causes the latter to move to the right in Fig. 1, forcing the water from the cylinder 8 out through the conduit 34 and into the discharge conduit to the casing 4, the speed at which this piston moves depending upon the size of the outlet from this cylinder, this being preferably controlled by means of a valve, such as that represented at 59, and carried by a spring-arm 60 secured to a plate 61 fastened to the interior of the plug 33 and coöperating with a pin 62 threaded in the cylinder 8 and adapted to bear at its lower end against the cam-portion 63. The spring 60 normally holds the valve 59 closed, but by adjusting the pin 62 the degree of opening may be regulated. The piston 36 continues to move to the right in Fig. 1 as stated, until the force exerted by the spring 40 is equalized by such force as may be exerted against the piston 36 by the water in flowing through the faucet, the pin 41 in this operation rotating the bell-crank lever 56 in clockwise direction in Fig. 1, and lifting the spring 51 out of braking engagement with the yoke 46. Assuming that the operator does not release his grasp on the handle 42 until after the piston 36 has moved to the right in Fig. 1, to the limit of its movement, the force of the incoming water exerted against the valve 22, assuming that the operator releases his grasp on the handle 42, will close the valve 22, close communication between the conduit 34 and the outlet of the passage, but maintain communication with the inlet 5 through the passage 30, and, through the medium of the valve-stem section 24 will return the handle 42 to the position shown in Fig. 1. The water entering the conduits 30 and 34 will thereupon flow into the cylinder 8, forcing the piston 36 to the position shown in Fig. 1 and compressing the spring 40. Should, however, the operator release his grasp on the handle 42 before the piston 36 has reached the limit of its movement to the right in Fig. 1, the handle 42 will remain in the position to which it was operated to open the valve, until the piston 36 reaches such a position in the cylinder 8 that the spring 51 will be released from the yoke 46 through the medium of the lever 56 and coöperating pin 41, whereupon the valve 22 will immediately close, the spring 51 being so tensioned that it will hold the handle 42 against returning to the position shown in Fig. 1 in opposition to the force of the incoming water against the valve 22. Should the operator wish to close the valve before the piston 36 has reached a position where it will automatically release the brake-spring 51 from engagement with the yoke 46, the operator may force the handle 42 back to the position shown in Fig. 1, which manually closes the valve 22.

If it is desired that a certain amount only of water flow from the casing with an actuation of the handle 42, the operator may draw the handle 42 forwardly (to the left in Fig. 1) to open the valve 22 and immediately thereupon release his grasp on the handle, the handle and valve 22 remaining in the positions to which they were moved, until the piston 36 operates to raise the spring 51 out of engagement with the yoke 46, it being understood that the amount of water which may be thus caused to flow, by the automatic shutting off action, may be regulated as desired by adjusting the pin 62.

While provision is made in the valve for the automatic operation of the same to close after a predetermined amount of water has discharged from the passage, the valve may nevertheless be operated, under the control of the operator, to cause water to flow indefinitely through the faucet so long as the operator holds the operating handle in operative position, where the amount of water passing through the faucet exceeds that at which the valve will automatically close. Where it is desired that the valve be closed before an amount of water equal to that which will be automatically measured by the automatic closing means, has passed therethrough, the operator shuts off the valve by manually returning it to normal, closed position. It will therefore be noted that a valve constructed in accordance with our invention presents such features as to render it of practical use, and insures the conserving of the water supply by reason of the automatic shut-off feature in case the operator leaves the valve in open condition, and permits of the operation of the valve for discharge from the faucet of any desired amount of water.

While we have illustrated and described a particular construction in which our invention is embodied, we do not wish to be understood as intending to limit it thereto, as the same may be variously modified and altered without departing from the spirit of our invention, it being our intention to claim our invention as fully and completely as the prior state of the art will permit.

What we claim as new and desire to secure by Letters Patent is:

1. Valve mechanism comprising a casing having an inlet and an outlet, a valve in said casing between said inlet and outlet for controlling communication therebetween, manually-operated means for opening and closing said valve, said valve operating automatically to close when not restrained, restraining means for said valve for holding the latter open in opposition to the force tending to seat it, after actuation by, and release of, said manually-operated means, fluid-pressure-controlled means for rendering said restraining means inoperative, and means for supplying fluid pressure to said fluid-pressure-controlled means from said inlet in the closed position of said valve.

2. Valve mechanism comprising a casing having an inlet and an outlet, a valve in said casing between said inlet and outlet for controlling communication therebetween, manually-operated means for opening and closing said valve, said valve operating automatically to close when not restrained, restraining means for said valve for holding the latter open in opposition to the force tending to seat it, after actuation by, and release of, said manually-operated means, piston and cylinder mechanism controllable by fluid pressure entering said casing for rendering said restraining means inoperative, and means for supplying fluid pressure to said piston and cylinder mechanism from said inlet in the closed position of said valve.

3. Valve mechanism comprising a casing having an inlet and an outlet, a valve in said casing between said inlet and outlet for controlling communication therebetween, manually-operated means for opening and closing said valve, said valve operating automatically to close when not restrained, restraining means for said valve for holding the latter open in opposition to the force tending to seat it, after actuation by, and release of, said manually-operated means, a cylinder, a piston in said cylinder, said cylinder being in communication with said inlet in the rear of said valve, whereby said cylinder is in communication with said inlet when said valve is closed, a spring tending to move said piston in a direction opposite to that of the flow of fluid pressure into said cylinder, and means actuated by said piston for rendering said restraining means inoperative.

4. Valve mechanism comprising a casing having an inlet and an outlet, a valve in said casing between said inlet and outlet for controlling communication therebetween, manually-operated means for opening and closing said valve, said valve operating automatically to close when not restrained, restraining means for said valve for holding the latter open in opposition to the force tending to seat it, after actuation by, and release of, said manually-operated means, a cylinder containing a port communicating with the interior of said casing, a valve carried by said first-named valve and adapted when in one position to close communication between said cylinder and casing, said last-named valve containing an opening communicating with said cylinder port and with said inlet, a piston in said cylinder, means tending to move said piston in opposition to the flow of fluid pressure into said cylinder, and means operated by said piston for rendering said restraining means inoperative.

5. Valve mechanism comprising a casing having an inlet and an outlet, a valve in said casing between said inlet and outlet for controlling communication therebetween, manually-operated means for opening and closing said valve, said valve operating automatically to close when not restrained, restraining means for said valve for holding the latter open in opposition to the force tending to seat it, after actuation by, and release of, said manually-operated means, a shiftable member operating when actuated to render said restraining means inoperative, a cylinder, a piston in said cylinder, said cylinder being in communication with said inlet in the rear of said valve, whereby said cylinder is in communication with said inlet when said valve is closed. means tending to move said piston in opposition to fluid pressure entering said cylinder, and means operated by said piston for actuating said shiftable member.

6. Valve mechanism comprising a casing having an inlet and an outlet, a valve in said casing between said inlet and outlet controlling communication therebetween and adapted to close by the force of fluid pressure entering said inlet, a member carried by said valve, a manually-operated device operatively engaging said member for shifting the latter and opening said valve, a restraining device engaging said manually-operated device for holding said valve open in opposition to the force of fluid pressure tending to seat it after actuation of said manually-operated device, a cylinder in said casing containing a port opening into said casing, said member being provided with a portion forming a valve closing said cylinder port to said casing when the valve is in one position, said portion having an opening connecting said cylinder port with said inlet, a piston in said cylinder, a spring tending to force said piston in opposition to fluid pressure entering said cylinder, and means actuated by said piston for rendering said restraining device inoperative.

7. Valve mechanism comprising a casing having an inlet and an outlet, a valve in said casing between said inlet and outlet controlling communication therebetween and adapted to close by the force of fluid pressure entering said inlet, a shiftable member carried by said valve, a manually-operated device operatively engaging said shiftable member for opening said valve against the fluid pressure entering said inlet, a spring brake-device coöperating with said manually-operated device for holding said valve open in opposition to the fluid pressure entering said inlet after actuation of said manually-operated device, a rock-lever adapted when actuated to release said brake-device from said manually-operated device, a cylinder in said casing containing a port communicating with said casing, said shiftable member having a portion operating when said valve is in one position to close communication between said cylinder and casing, said portion containing an opening registering with said cylinder-port and with said inlet, a piston in said cylinder, a spring tending to move said piston in opposition to the fluid pressure in said cylinder, and means operated by said piston for actuating said rock-lever.

8. Valve mechanism comprising a casing having an inlet and an outlet, a valve in said casing between said inlet and outlet for controlling communication therebetween, manually-operated means for opening and closing said valve, said valve operating automatically to close when not restrained, restraining means for said valve for holding the latter open in opposition to the force tending to seat it, after actuation by, and release of, said manually-operated means, a cylinder containing a port communicating with the interior of said casing, a second valve adapted when in one position to close communication between said cylinder and casing and operated to open position by actuating said manually-operated means, means for causing said cylinder to be in communication with said inlet when said first-named valve is closed for charging said cylinder with the pressure from the source of fluid-pressure controlled by the valve mechanism, a piston in said cylinder, means tending to move said piston in opposition to the flow of fluid pressure into said cylinder, and means operated by said piston for rendering said restraining means inoperative.

9. Valve mechanism comprising a casing having an inlet and an outlet, a valve in said casing between said inlet and outlet for controlling communication therebetween, manually-operated means for opening and closing said valve, said valve operating automatically to close when not restrained, restraining means for said valve for holding the latter open in opposition to the force tending to seat it, after actuation by, and release of, said manually-operated means, a cylinder containing a port communicating with the interior of said casing, a second valve adapted when in one position to close communication between said cylinder and casing and operated to open position by actuating said manually-operated means, means for causing said cylinder to be in communication with said inlet when said first-named valve is closed for charging said cylinder with the pressure from the source of fluid-pressure controlled by the valve mechanism, a piston in said cylinder, means tending to move said piston in opposition to the flow of fluid pressure into said cylinder, means operated by said piston for rendering said restraining means inoperative, and adjustable valve means controlling said port.

10. Valve mechanism comprising a casing having an inlet and an outlet, a valve in said casing between said inlet and outlet for controlling communication therebetween, manually-operated means for opening and closing said valve, said valve operating automatically to close when not restrained, restraining means for said valve for holding the latter in stationary open position in opposition to the force tending to seat it, after actuation by, and release of, said manually-operated means, comprising a shiftable member engaging said manually-operated means for holding the latter in said stationary position, a lever adapted to shift said member out of restraining position, and means operating automatically after a predetermined time from the opening of said valve has elapsed for actuating said lever to render said restraining means inoperative.

11. Valve mechanism comprising a casing having an inlet and an outlet, a valve in said casing between said inlet and outlet for controlling communication therebetween, manually-operated means for opening and closing said valve, said valve operating automatically to close when not restrained, restraining means for said valve for holding the latter in stationary open position in opposition to the force tending to seat it, after actuation by, and release of, said manually-operated means, comprising a spring device supported at one end and bearing frictionally against said manually-operated means for holding the latter in said stationary position, a lever engaging said spring and operating when actuated to relieve the pressure of said spring against said manually-operated means, and means for actuating said lever to render said spring device inoperative.

12. Valve mechanism comprising a casing having an inlet and an outlet, a valve in said casing between said inlet and outlet for controlling communication therebetween, manually-operated means for opening and closing said valve, said valve operating automatically to close when not restrained, restraining means for said valve for holding the latter open in opposition to the force tending to seat it, after actuation by, and release of, said manually-operated means, comprising a shiftable member engaging said manually-operated means, a lever adapted to shift said member out of restraining position, and means, operating automatically after a predetermined time from the opening of said valve has elapsed, for actuating said lever to render said restraining means inoperative, comprising a cylinder, a fluid-pressure-operated piston in said cylinder, a spring coöperating with said piston, and means on said piston operating when the latter moves to a certain position under the action of said spring, to actuate said lever for moving said shiftable member out of restraining position.

ISADORE S. SCHNEIDER.
JOSEF LANDAUER.

Copies of this patent may be obtained for five cents each, by addressing the "Commissioner of Patents, Washington, D. C."